United States Patent [19]

Okita

[11] 4,248,924

[45] * Feb. 3, 1981

[54] ASYMMETRIC POROUS FILM MATERIALS AND PROCESS FOR PRODUCING SAME

[75] Inventor: Koichi Okita, Osaka, Japan

[73] Assignee: Sumitomo Electric Industries, Ltd., Osaka, Japan

[*] Notice: The portion of the term of this patent subsequent to Apr. 4, 1995, has been disclaimed.

[21] Appl. No.: 830,288

[22] Filed: Sep. 2, 1977

[30] Foreign Application Priority Data

Sep. 3, 1976 [JP] Japan ................................. 51-105912

[51] Int. Cl.³ .................... B32B 27/02; B01D 13/04; D01D 5/12; B29D 27/00
[52] U.S. Cl. .................... 428/212; 210/510; 210/500.2; 264/210.8; 264/288.8; 428/227; 428/305; 428/317; 428/422
[58] Field of Search .............. 428/227, 422, 305, 317, 428/212; 264/210 F, 288, 319; 210/321 R, 500 R, 500 M, 510

[56] References Cited

U.S. PATENT DOCUMENTS

| Re. 27,026 | 1/1971 | Alfrey et al. | 210/510 X |
|---|---|---|---|
| 3,331,772 | 7/1967 | Brownscombe et al. | 210/500 M |
| 3,630,800 | 12/1971 | Nash | 264/210 F |
| 3,764,363 | 10/1973 | Civardi et al. | 428/305 |
| 3,933,653 | 1/1976 | Hashino et al. | 210/500 M |
| 4,082,893 | 4/1978 | Okita | 428/422 X |
| 4,096,227 | 6/1978 | Gore | 264/288.8 |
| 4,116,892 | 9/1978 | Schwarz | 264/288.8 |

*Primary Examiner*—Harold Ansher
*Attorney, Agent, or Firm*—Sughrue, Rothwell, Mion, Zinn and Macpeak

[57] ABSTRACT

Porous film materials composed of polytetrafluoroethylene having an asymmetric structure are produced by stretching the film using a pair of revolving rolls which are heated to a temperature lower than the melting point of the film. Stretching is produced by revolving the two rolls at different speed which also tends to produce a compressive force in the thickness of the film. The rolls are heated to different temperatures to produce a temperature difference of preferably 50° C. or more. The combination of the compressive force and the temperature gradient in the thickness of the film is believed to produce the asymmetric structure in the resulting porous film materials which are characterized by a fiber structure in the front surface which is different from that in the back surface.

5 Claims, 2 Drawing Figures

ASYMMETRIC POROUS FILM MATERIALS AND PROCESS FOR PRODUCING SAME

BACKGROUND OF THE INVENTION

The present invention relates to porous film materials composed of polytetrafluoroethylene and particularly to asymmetric porous film materials having an unhomogeneous structure that the fiber structure of the porous polytetrafluoroethylene in the front surface is different from that in the back and a process for producing the same.

Processes for producing porous polytetrafluoroethylene materials have been described in Japanese Patent Publications Nos. 13560/67 and 18991/76. These processes are characterized by molding a tetrafluoroethylene resin containing a liquid lubricating agent by extruding or rolling or by both to form sheets, rods or tubes and heating thereafter to about 327° C. or more with stretching in at least one direction under an unsintered state. The porous materials produced by these processes have a fiber structure comprising nodules linked by fine filaments, but the state of the nodules and filaments varies somewhat depending on the stretching ratio, the stretching temperature or the speed at which the materials are stretched. The space surrounded with the filaments and the nodules corresponds with a pore. In general, by increasing the stretching ratio, the length of the filaments increases and the size of the nodules decreases and, consequently, the porosity increases.

SUMMARY OF THE INVENTION

The present invention relates to an improvement of these processes and, particularly, it is characterized by the fiber structure including the length and thickness of the filaments in the porous polytetrafluoroethylene film and the state of the nodules linked by these filaments being unhomogeneous, wherein the fiber structure in the front surface is different from that in the back surface and, consequently, it provides films wherein the pore size in the front surface is different from that in the back surface, namely, asymmetric porous films. Generally, films wherein the pore size in the front surface is equal to that in the back surface are called symmetric porous films. The prior porous polytetrafluoroethylene films are such symmetric porous films.

Further, the present invention relates to a process for producing asymmetric porous films which is characterized by molding a polytetrafluoroethylene resin containing a liquid lubricating agent by a paste method to form a film, removing the liquid lubricating agent and stretching continuously by revolving rolls heated to a temperature lower than the melting point of the polytetrafluoroethylene, wherein a temperature difference is provided between the low-speed roll and the high-speed roll.

DETAILED DESCRIPTION OF THE INVENTION

Figure 1:
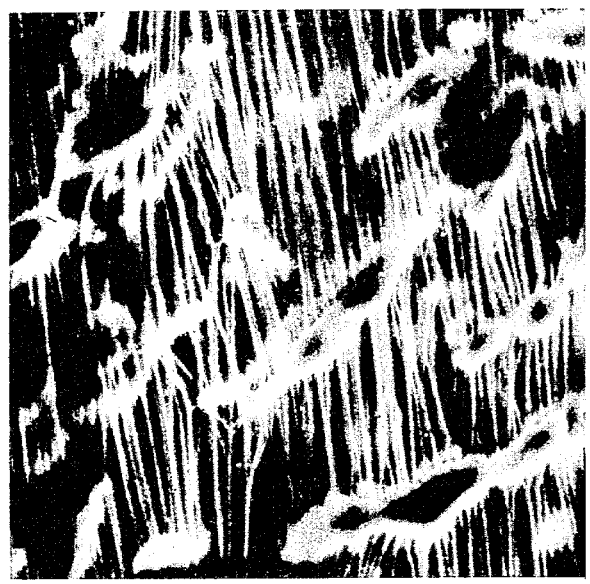
FIG. 1 is a scanning type electron photomicrograph of the back surface of a film according to the invention magnified to 1000 times.

In the prior processes for producing polytetrafluoroethylene films, stretching is carried out at a fixed temperature, by which symmetric porous films are always obtained. Accordingly, a process for producing asymmetric porous films as in the present invention has not been known.

On the other hand, it has been known that reverse osmosis or ultrafiltration membranes represented by cellulose ester films are almost asymmetric porous films having an unhomogeneous structure wherein the pore size in the front surface is tenfold to more than hundredfold different from that in the back surface.

Recently, processes for producing asymmetric porous films using aromatic polyamides or acrylonitrile, etc. have been described. However, these processes can not be utilized for polytetrafluoroethylene because dissolution of resins is essential in these processes. This is because no solvent to dissolve polytetrafluoroethylene is known.

In industrial use of porous films, it is required that the films have a function of carrying out correctly filtration, condensation and separation of different components in mass treatment. Though the narrower the distribution of the pore size is, the more the filtration or the separation can be correctly carried out, it is necessary, in order to increase the amount treated per unit area and unit time, to greatly increase the number of pores or to decrease the thickness of the film material to as thin as possible. To greatly increase the number of pores is very difficult under the specific conditions for production. Further, a rapid decrease in the thickness is not a practical solution because it causes a deterioration in the mechanical strength of the film. As techniques for overcoming such defects, asymmetric porous cellulose ester films have been developed, and they have been practically used as reverse osmosis membranes for desalting of sea water and other uses, while prior symmetric porous films are not economically advantageous in these applications. As described above, asymmetric porous films are economically superior to prior symmetric porous films because the former have a larger treating capability in the same functions of filtration or separation.

The asymmetric porous film materials of the present invention are composed of nodules linked to one another by very fine filaments, wherein the fiber structure including the length and thickness of the filaments or state of the nodules in the surface is different from that in the back. Accordingly, these film materials have the characteristic that the pore size is asymmetric corresponding with the difference in length or thickness of the filaments. The front surface and the back surface described here, which depend upon conditions for production, mean both surfaces of one film material. Though any of the surfaces may be called the "surface", the face having a smaller pore size is usually called front surface and the face having a larger pore size is called "back surface" in this specification. In order to use the film materials for filtration, it is effective to permeate a solution from the face having the smaller pore size.

The filament length is defined as the distance between one nodule and another nodule. When the filament contacts another nodule between two nodules, the filament length means the shortest distance between the nodules. Therefore, only filaments which form the space of a pore can be used to define the dimensions of the pore. Further, average filament length can be calculated as a weighted mean of each filament length. The filament length in these pore spaces is very different between both surfaces and the difference is 5 times even in the case of a small difference and it is often 50 times or more. Filament length in the back surface as defined in this specification can be clearly discriminated by means of a scanning type electron microscope at a magnification of 1000 as, for example, $1\mu$ to $100\mu$ or so, while filament length in the front surface is as short as, for example, $0.1\mu$ to $10\mu$ which can not be discriminated sometimes.

Figure 2:
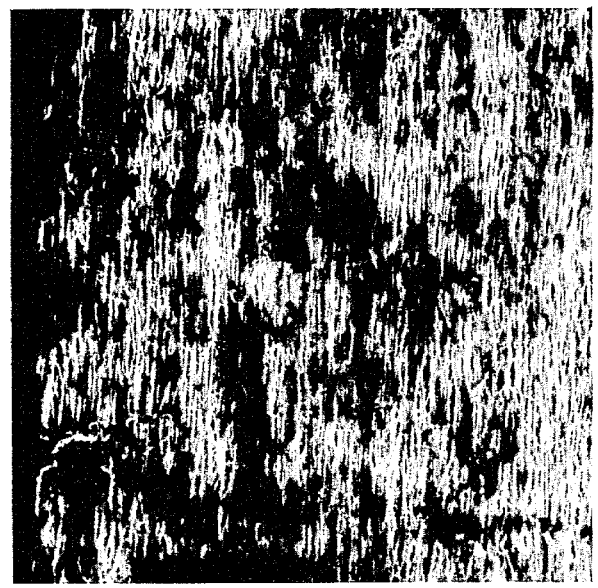
FIG. 2 is a scanning type electron photomicrograph of the front surface of a film according to the invention also magnified to 1000 times.

Referring to the drawing, the length of a filament in the back surface as shown in FIG. 1 is $15\mu$ to $30\mu$, while the length of a filament in the front surface as shown in FIG. 2 corresponds to less than $1\mu$. As will be observed, the ratio of filament length in the two surfaces shown in FIG. 1 and FIG. 2 is at least 15 times to 30 times.

In the case of a uniaxial stretching, the nodules in the back surface shown in FIG. 1 become long and slender independently, and the longer axis of the nodule is oriented perpendicularly to the stretching direction. On the other hand, in the front surface shown in FIG. 2, independent nodules are not observed, and the nodules are linked to one another such that the whole surface appears as if it were a mat.

The front surface and the back surface of the film do not always have the state shown in FIG. 1 and FIG. 2. Thus, these figures show only an example. For example, there is a case where the average filament length in the front surface is not different from that in the back surface but the nodules in the back surface are independently long and slender, while the long axis of the nodules in the front surface is by far the longer even though the shorter axis thereof is the same as that of the back surface. Further, a case where independent nodules do not exist in the front surface and all nodules link linearly to one another has also been recognized. In this case, however, the nodules in the back surface are independent of one another. When all nodules in the front surface link one another, the average filament length is shorter than that in the back surface. One extreme example of such a case is that shown in FIG. 1 and FIG. 2.

Here, the ratio of the thickness of the fiber structure in the front surface and the back surface to the overall thickness of the film material becomes a problem. For use in filtration or separation, it is preferred for the front surface layer having a small pore size to be as thin as possible. On the other hand, in applications requiring high strength such as when operating under a high pressure or for superprecise separation, it is preferred for the front surface layer to have a certain minimum thickness. Though the variation of the fiber structure in the thickness direction of the film material is a factor causing the asymmetric pore size, the objects of the present invention are those wherein at least both surfaces each have a different fiber structure. This includes those characterized by a front surface layer having a small pore size and which is as thin as possible, as well as those characterized by having a fairly large thickness and those characterized by a back surface layer which is as thin as possible.

As for the polytetrafluoroethylene used in the present invention, all resins can be utilized if they are resins called fine powders suitable for the paste method. This resin powder is uniformly mixed with the liquid lubricating agent and the mixture is then subjected to previous compression molding. It is then extruded and/or rolled to mold in a film. The liquid lubricating agent is then removed by evaporation or extraction. These steps are called the paste method in the prior art and are known as a process for producing sealing materials.

Then, the film is expanded, in most cases, in at least one direction or stretched by a pair of rolls having a different revolving ratio in the direction of rolling. In this case, the stretching is carried out by heating the film to a temperature of less than about 327° C. which is less than the melting point of the polytetrafluoroethylene. Though the heating may be carried out by air-heating a stretching space by means of a furnace, it is convenient to directly heat the rolls. Hitherto, heating uniformly to the same definite temperature has been employed. However, according to the present invention, it is preferred for the temperature of the high-speed roll to be higher than that of the low-speed roll, and it is particularly preferred for the temperature difference between both of them to be at least 50° C. Though a temperature difference of 30° to 49° C. causes change of fiber structure such as in the long axis of the nodules, such a change becomes remarkable where the temperature difference is 50° C. or more.

In these cases, it has been found that by keeping the temperature of the high-speed roll to at least 250° C. but lower than the melting point of the polytetrafluoroethylene, the front surface and the back surface of the film material each have a different fiber structure including average filament length, and the desired asymmetric pore size can be effectively obtained.

The reason why the fiber structure changes as described above is believed to be as follows.

The film heated to a temperature of the low-speed roll is first of all stretched due to the different revolving speeds of the rolls. Tension is necessary in order to stretch the film drawn by the rolls, and this tension is caused by transmission of the revolving power of the rolls at fulcrums where the film contacts the rolls. Since the contact of the film becomes an arc, the tension is caused in the stretching direction of the film while a compressive force corresponding to the tension is caused in the thickness direction. At the same time, one surface of the film in contact with the high-speed roll is heated to the higher temperature to cause a temperature gradient in the thickness direction of the film. It is believed that both the temperature gradient in the thickness direction of the film and the compressive force are factors which cause the change of fiber structure. The nodules forming the fiber structure and average filament length not only depend upon the revolving ratio of the rolls, but also are affected by factors such as the thickness of the film used, the strength of the film before stretching and the residual amount of the liquid lubricating agent, etc. However, in cases where a temperature gradient is present but the compressive force is insufficient or in cases where a temperature gradient is not present though the compresive force is sufficient, the change of fiber structure in the front surface and the back surface of the film does not occur.

The revolving ratio of the rolls, the tangential surface speed of the low-speed roll, the diameter of the rolls, the thickness and the strength of the film are related to the tension and, therefore, they become factors for controlling the compressive force. Here, the revolving ratio of the rolls means the ratio of the tangential surface speeds of the rolls when the diameter of each roll is different.

On the other hand, the revolving rolls have a temperature difference and preferably 50° C. or more. Further, the temperature of the high-speed roll is set at 250° C. or more by which it is possible to provide a temperature distribution in the thickness direction of the film.

After the conclusion of the stretching step, the film is sintered at a temperature of about 327° C. or more.

Further, it is possible to carry out the stretching step twice or more. It is only necessary that the rolls have a temperature difference in at least one stretching step and the temperature difference is preferably 50° C. or more. It is not critical to the practice of the invention whether the first stretching step is carried out without a temperature difference or the final stretching step is carried out without a temperature difference. But in any case, by carrying out at least one stretching step using rolls a temperature difference existing, the fiber structure of the film becomes asymmetric. Under some conditions where it is difficult to obtain the asymmetric state, it is preferred to carry out two or more stretching steps with a temperature difference. On the other hand, when the asymmetric state is excessively obtained, it is preferred that the final stretching step be without a temperature difference.

The degree of difficulty of making the asymmetric state is affected by the thickness of the film, the strength of the film, the temperature of the rolls, the temperature difference and the revolving ratio of the rolls. In general, the asymmetric state is more easily obtained if the thickness of the film is thinner, the strength is higher, the temperature of the rolls is higher, the temperature difference is larger and the revolving ratio is larger.

Determination of the asymmetric state of the film is easily carried out using the above described photomicrographs. Further, the degree of the asymmetric state can be measured by the distribution of pore size or a measurement of the bubble point (maximum pore size) according to the ASTM F316-70 method or a measurement of the porosity according to the ASTM D276-72 method. If the bubble point is measured by applying pressure to both of the front surface and the back surface of the film, the difference between both measurement values becomes large with an increase in the degree of the asymmetric state.

In the following, examples are described in order to illustrate the present invention in detail.

EXAMPLE 1

After uniformly mixing 50 kg of Polyflon F-103, tradename of a polytetrafluoroethylene produced by Daikin Kogyo Co., Ltd. with 11.5 kg of white oil (Smoyl P-55, produced by Muramatsu Petroleum Co.), the mixture was first molded by compression to form cubes 300 mm on a side. The molded mixture was then extruded from a die orifice of $12 \times 300$ mm$^2$, and the resulting sheet was rolled using a callender roll to form a long film having a thickness of 0.3 mm. After removing the white oil with trichloroethylene, the thickness was 0.32 mm, the specific gravity was 1.65, the tensile strength in the lengthwise direction after rolling was 1.3 kg/mm$^2$ and that in the crosswise direction was 0.25 kg/mm$^2$.

The film was stretched using a pair of 120 mm rolls capable of being heated to 330° C. under conditions that the distance of stretching the film was 8.5 mm, the revolving ratio of the rolls was 1:9, the surface speed of the low-speed roll was 2 m/min, the temperature of the low-speed roll was 130° C. and the temperature of the high-speed roll was varied as shown in Table 1.

Finally, the film was sintered at a temperature of about 327° C. or more. The characteristics of the resulting film are shown in Table 1.

TABLE 1

| Experiment No. | Temperature of high-speed roll (°C.) | Porosity (%) | | Tensile strength in lengthwise direction (kg/mm) | | Thickness (mm) | |
|---|---|---|---|---|---|---|---|
| | | Before sintering | After sintering | Before sintering | After sintering | Before sintering | After sintering |
| 1 | 280 | 79 | 74 | 2.45 | 4.30 | 0.12 | 0.09 |
| 2 | 230 | 82 | 75 | 1.85 | 4.26 | 0.12 | 0.08 |
| 3 | 180 | 82 | 77 | 1.45 | 4.80 | 0.11 | 0.08 |
| 4 | 130 | 84 | 78 | 0.99 | 4.05 | 0.10 | 0.09 |

It is observed that though the porosity before sintering decreases as the temperature of the high-speed roll is increased, the tensile strength becomes large. Here, the porosity is that calculated from a measurement of the specific gravity.

EXAMPLE 2

Stretching was carried out under the same conditions as in Example 1 except that the revolving ratio of the rolls was 1:12 and the surface speed of the low-speed roll was 25 cm/min. The characteristic values obtained are shown in Table 2.

The relationship of the porosity and the tensile strength to the temperature of the high speed roll have the same tendency as the results in Example 1, but the tensile strength in the lengthwise direction is higher than the case of Example 1.

TABLE 2

| Experiment No. | Temperature of high speed roll (°C.) | Porosity (%) | | Tensile strength (kg/cm$^2$) | | Bubble Point (kg/cm$^2$) | |
|---|---|---|---|---|---|---|---|
| | | Before sintering | After sintering | Before sintering | After sintering | Front Surface | Back Surface |
| 5 | 320 | 84 | 76 | 2.8 | 5.6 | 0.86 | 0.69 |
| 6 | 300 | 81 | 75 | 3.6 | 6.0 | 0.85 | — |
| 7 | 280 | 82 | 75 | 2.8 | 5.5 | 0.81 | — |
| 8 | 230 | 80 | 75 | 2.3 | 5.4 | 0.50 | — |
| 9 | 180 | 80 | 71 | 2.0 | 5.8 | 0.56 | — |
| 10 | 130 | 72 | 69 | 2.2 | 5.3 | 0.77 | 0.75 |

The bubble point shows a pressure at which the initial air bubble passes through the film wetted by alcohol, which is in inverse proportion to the pore size of the film. The higher the bubble point is, the smaller the pore size is, while the lower the bubble point is, the larger the pore size is.

In order to confirm the difference of fiber structure between the front surface and the back surface of the film, the bubble point measured by applying air pressure to the front surface and the bubble point measured by applying air pressure to the back surface were compared. A remarkable difference is observed in Experiment No. 5. In Experiment No. 10, they coincide with each other in a range of experimental error. Where the bubble point of the front surface coincides with that of the back surface of the film, is a symmetric porous film. A large difference in the bubble point means more advancement toward the asymmetric porous state.

EXAMPLE 3

Stretching was carried out in the same manner as in Example 1 except that the revolving ratio of the rolls was 1:12, the surface speed of the low-speed roll was 25 cm/min, the distance of stretching the film was 15.5 mm, the temperature of the high speed roll was 300° C. and the temperature of the low-speed roll was varied. The measured results are shown in Table 3.

TABLE 3

| Experiment No. | Temperature of low-speed roll (°C.) | Porosity (%) | Bubble point (kg/cm$^2$) Front Surface | Bubble point (kg/cm$^2$) Back Surface | Permeation time (second) Front Surface | Permeation time (second) Back Surface |
|---|---|---|---|---|---|---|
| 11 | 50  | 77 | 0.47 | 0.44 | 20.2 | 19.2 |
| 12 | 80  | 74 | 0.79 | 0.73 | 39.5 | 38.7 |
| 13 | 130 | 72 | 0.81 | 0.68 | 45.1 | 31.0 |
| 14 | 150 | 73 | 0.83 | 0.71 | 41.5 | 30.7 |
| 15 | 200 | 79 | 0.80 | 0.74 | 35.5 | 28.6 |
| 16 | 250 | 86 | 0.20 | 0.19 | 8.7  | 7.2  |
| 17 | 300 | 84 | 0.28 | 0.27 | 9.2  | 8.9  |

Here, the measured values are those after sintering. The permeation time means the time necessary for passing 100 ml of isopropanol at a pressure difference of 70 cmHg through an effective area of 40 mm$\phi$. The characteristic values in the front surface and the back surface of the film are particularly remarkable in Experiment Nos. 12–15.

EXAMPLE 4

In order to examine the effect caused by the contact time between the high speed roll and the film, the following experiments were carried out in the same manner as in Example 1.

The diameter of the low-speed roll was 120 mm, the temperature thereof was 100° C. and the surface speed thereof was 240 cm/min. The distance of stretching the film was 15.5 mm. The temperature of the high-speed roll was 300° C. and the diameter thereof was 120 mm, 80 mm or 40 mm, but the surface speed of the roll was set such that the stretching ratio caused by the revolving ratio was 800%. The contact time of the stretched film with the high-speed roll was almost proportional to the diameter of the roll. The measured results are shown in Table 4.

TABLE 4

| Experiment No. | Diameter of high-speed roll (mm) | Porosity (%) | Bubble Point (kg/cm$^2$) Front Surface | Bubble Point (kg/cm$^2$) Back Surface | Permeation time (second) Front Surface | Permeation time (second) Back Surface |
|---|---|---|---|---|---|---|
| 18 | 40  | 68 | 0.98 | 0.89 | 34.8 | 30.5 |
| 19 | 80  | 67 | 1.08 | 0.95 | 43.2 | 41.6 |
| 20 | 120 | 66 | 1.12 | 1.05 | 51.0 | 47.8 |

As the diameter of the high-speed roll increases the bubble point becomes high and, consequently, the pore size becomes small. However, the porosity increases as the diameter of the roll decreases and the permeation time becomes short. The characteristic values between the surface and the back surface are clearly different, and the difference of fiber structure between them is remarkable.

EXAMPLE 5

In order to examine the effect when the stretching step is performed twice, the same procedure as in Example 1 was carried out. The first stretching step was carried out under conditions that the surface speed of the low-speed roll was 1 m/min, the temperature of the low-speed roll was 200° C., the temperature of the high speed-roll was 300° C., the distance of stretching the film was 15.5 mm and the revolving ratio of the rolls was 1:2. Then the second stretching step was carried out under the same conditions as the first stretching step except that the revolving ratio of the rolls was varied as shown in Table 5. The measured results after sintering are shown in Table 5.

TABLE 5

| Experiment No. | Revolving ratio of rolls | Porosity (%) | Bubble point (kg/cm$^2$) Front Surface | Bubble point (kg/cm$^2$) Back Surface | Permeation time (second) Front Surface | Permeation time (second) Back Surface |
|---|---|---|---|---|---|---|
| 21 | 1:3 | 80.5 | 0.80 | 0.70 | 39.8 | 35.6 |
| 22 | 1:4 | 80.1 | 0.95 | 0.90 | 46.6 | 39.7 |
| 23 | 1:5 | 78.2 | 1.06 | 0.95 | 61.9 | 54.7 |

EXAMPLE 6

The first stretching step was carried out under the same conditions as in Example 5 except that the temperature of the low-speed roll and the high-speed roll was 200° C. The second stretching step was carried out under conditions that the surface speed of the low-speed roll was 3 m/min, the temperature was 200° C., the temperature of the high-speed roll was 300° C. and the distance of stretching the film was 15.5 mm. and the revolving ratio of the rolls was varied as shown in Table 6. The measured results are shown in Table 6.

TABLE 6

| Experiment No. | Revolving ratio of rolls | Porosity (%) | Bubble point (kg/cm$^2$) Front Surface | Bubble point (kg/cm$^2$) Back Surface | Permeation time (second) Front Surface | Permeation time (second) Back Surface |
|---|---|---|---|---|---|---|
| 24 | 1:2.5 | 83.5 | 0.58 | 0.49 | 25.1 | 22.5 |
| 25 | 1:3   | 82.1 | 0.68 | 0.62 | 30.1 | 29.6 |
| 26 | 1:3.5 | 80.5 | 0.71 | 0.63 | 35.1 | 34.1 |
| 27 | 1:4   | 81.3 | 0.77 | 0.73 | 31.8 | 30.1 |
| 28 | 1:5   | 78.2 | 0.81 | 0.70 | 37.0 | 36.0 |

What is claimed is:

1. An asymmetric porous film material of polytetrafluoroethylene wherein said polytetrafluoroethylene has a fiber structure comprising nodules linked to one another by filaments and wherein the fiber structure is such that the average filament length in one surface of said porous film material is different from the average filament length in the opposite surface of said porous film material.

2. The asymmetric porous film material as set forth in claim 1, wherein the average filament length in said one surface of said porous film material is different from the average filament length in said opposite surface of said porous film material by a factor of at least 5.

3. The asymmetric porous film material as set forth in claim 1, wherein the shape of the nodules in said one surface of said porous film material is different from the shape of the nodules in said opposite surface of the porous film material.

4. The asymmetric porous film material as set forth in claim 1, wherein said one surface of said porous film material has a state such that a part of said nodules are linked to one another by being bonded directly to neighbor nodules and said opposite surface of said porous film material has a state such that said nodules are bonded to said filaments and are therefore not bonded to neighbor nodules directly.

5. The asymmetric porous film material as set forth in claim 1, wherein the average filament length in said one surface of said porous film material ranges from $1\mu$ to $100\mu$ and the average filament length in said opposite surface of said porous film material ranges from $0.1\mu$ to $10\mu$.

* * * * *